United States Patent [19]

Reiff et al.

[11] 3,868,350

[45] Feb. 25, 1975

[54] THERMOPLASTIC POLYURETHANE POLYUREA POWDERS

[75] Inventors: Helmut Reiff, Cologne; Harro Witt, Dormagen; Dieter Dieterich, Leverkusen, all of Germany

[73] Assignee: Bayer Aktiengesellschaft, Leverkusen, Germany

[22] Filed: May 25, 1973

[21] Appl. No.: 364,180

[30] Foreign Application Priority Data

May 31, 1972 Germany.......................... 2226526

[52] U.S. Cl............. 260/77.5 Q, 117/21, 117/93.4, 117/161, 260/29.2 TN, 260/75 NE, 260/77.5 AA, 260/77.5 AM
[51] Int. Cl..................... C08g 22/00, C08g 53/03
[58] Field of Search... 260/29.2 TN, 77.5 AA, 75 NE, 260/77.5 Q

[56] References Cited
UNITED STATES PATENTS

| | | | |
|---|---|---|---|
| 3,148,173 | 9/1964 | Axelrood..................... | 260/29.2 TN |
| 3,281,397 | 10/1966 | Axelrood..................... | 260/29.2 TN |
| 3,294,724 | 12/1966 | Axelrood..................... | 260/29.2 TN |
| 3,388,087 | 6/1968 | Dieterich et al............. | 260/29.2 TN |
| 3,437,624 | 4/1969 | Dawn et al.................. | 260/29.2 TN |
| 3,442,843 | 5/1969 | Keberle et al.............. | 260/29.2 TN |
| 3,525,717 | 8/1970 | Butler et al.................... | 260/75 NE |
| 3,607,837 | 9/1971 | Reegen....................... | 260/29.2 TN |
| 3,622,527 | 11/1971 | Dieterich et al............. | 260/2.5 AY |
| 3,714,095 | 1/1973 | Reischl et al................ | 260/77.5 Q |
| 3,770,681 | 11/1973 | Witt et al..................... | 260/29.2 TN |

FOREIGN PATENTS OR APPLICATIONS 1,158,088 7/1969 Great Britain................. 260/77.5 Q

*Primary Examiner*—H. S. Cockeram
*Attorney, Agent, or Firm*—Gene Harsh

[57] ABSTRACT

Thermoplastic polyurea powders and sedimenting aqueous solutions of the same wherein the powders have
  a. an average particle diameter of from 10 to 1,000 $\mu$,
  b. a melting range of from 100° to 180°C.,
  c. a urea and, optionally, urethane group content of from 10 to 30% by weight, with the proviso that the urea group content is at least about 5%, and
  d. an ionic group content of from 0.01 to 0.15 milliequivalents per gram;

prepared by reacting (1) polyurethanes which contain free NCO groups and ionic groups with (2) primary and/or secondary aliphatic diamines and/or dicarboxylic acid-bis-hydrazides at an NH to NCO ratio of from 0.1 to 0.95 and in the presence of water. The powders are useful for finishing textiles, for coatings, as binders or as auxiliary agents in the paper industry, and the like.

17 Claims, No Drawings

THERMOPLASTIC POLYURETHANE POLYUREA POWDERS

BACKGROUND OF THE INVENTION

It is known that polyurethanes which have ionic groups in the molecule can be converted into aqueous dispersions. U.S. Pat. No. 3,479,310 describes the synthesis of ionic polyurethanes from organic polyisocyanates and compounds having at least two reactive hydrogen atoms by using compounds which, as well as at least one NCO-group or at least one reactive hydrogen atom, also contain at least one salt-like group or at least one group capable of salt formation. In a preferred embodiment of the process, a dispersion is prepared from a solution of an ionic polyurethane synthesized in this way in a medium comprising a suitable organic solvent which is replaced by water.

There are three possibilities of synthesizing the polyurethane according to the ratio of the isocyanate groups to the reactive hydrogen atoms:
1. NCO groups in a deficit;
2. Equivalence; and
3. NCO groups in excess.

During the conversion into an aqueous dispersion, there are no further chemical reactions with the water in cases 1 and 2. A maximum chain length is only possible in case (2). However, since it is only predominantly linear polyurethanes of relatively high molecular weight which are adequately soluble in organic solvents, this maximum chain length can only be achieved by substantially eliminating crosslinking reactions. The latex particles according to (1) and (2) are soluble in dimethyl formamide for example.

The circumstances are different in case (3). The excess NCO groups react with water, and chain extension and branching of the molecules occurs. The latex particles can be substantially insoluble in dimethyl formamide. This process has a few serious disadvantages and generally leads to agglomerations in the mixtures. The main disadvantage is that the latex initially formed undergoes marked changes with time. Thus an initially thinly liquid, finely divided latex can agglomerate or curdle completely after a few hours or, in some cases, after a few days. Another disadvantage is that relatively large quantities of water are required, in order to prepare a latex in the first instance. Furthermore, reproducibility is extremely poor.

German Auslegeschrift No. 1,282,962 describes the preparation of aqueous, sedimenting re-dispersible dispersions of cross-linked polyaddition products having urea groups from ionically modified NCO-polyurethanes and polyamines by mixing polyurethanes containing ionic groups and free isocyanate groups with triamines or polyamines in the presence of water. If this procedure is applied to secondary or even primary diamines, more or less rapid agglomeration, gelatinization or curdling is always obtained where there is a deficit of NCO groups (cf. 1) or in the case of equivalence (cf. 2). Suspensions or dispersions were not obtained in either case.

SUMMARY OF THE INVENTION

We have surprisingly now found that aqueous, sedimenting re-dispersible suspensions of polyurea powders that are thermoplastic and not crosslinked are obtained by reacting a polyurethane containing both ionic groups and also free isocyanate groups with a stoichiometric deficit of a diamine or dicarboxylic acid-bishydrazide in the presence of water.

It is surprising that the reaction of NCO-prepolymers with the aforementioned chain-extending agents, more particularly with diprimary diamines, should lead to the production of uncrosslinked thermoplastic products, especially since it is known that urea groups which are formed immediately enter into a further reaction with isocyanate groups to form biuret groups, accompanied by branching and, ultimately, crosslinking (cf. Kunststoffe, 55, 249 – 253 (1965); Makromolekulare Chemie 101, 337 – 366 (1967); Journal Cellular Plastics 4, 262–275 (1968). In particular, however, a reaction of this kind is expected where diamines are used in a stoichiometric deficit. Thus, even crosslinked elastomers are formed under these conditions in the one phase system. Accordingly, the formation of thermoplastic polyurethanes polyureas actually occurs under the very conditions under which it had been least expected among experts.

It is also surprising that, following sedimentation, suspensions of thermoplastic polyurethane ureas of this kind can readily be re-dispersed at any time. On the strength of previous experience, suspensions of ionically modified thermoplastic isocyanate polyaddition products had been expected to coalesce irreversibly after sedimentation, as described, for example in DOS No. 1,694,129.

Accordingly, the present invention relates to a process for the production of thermoplastic polyurea powders which have an average particle diameter in the range of from 10 to 1,000 $\mu$ wherein a polyurethane which contains isocyanate groups and ionic groups is reacted with a chain extending agent in the presence of water, distinguished by the fact that
a. the content of ionic groups in the polyurethane is adjusted so that the end products have an ionic group content of from 0.01 to 0.15 milliequivalents per gram;
b. the chain extending agent is a primary and/or secondary diamine wiht aliphatic amino groups and or dicarboxylic acid-bis-hydrazides; and
c. the NH/NCO ratio during the chain extension reaction is in the range of from 0.1 to 0.95, The present invention also relates to thermoplastic polyurea powders, characterized by
a. an average particle diameter of from 10 to 1,000 $\mu$;
b. a melting range of from 100° to 180°C;
c. a urea and urethane group content of together from 10 to 30% by weight, with the proviso that the urea group content is at least about 5%; and
d. an ionic group content of from 0.01 to 0.15 milliequivalents per gram.

DETAILED DESCRIPTION

In one preferred embodiment of the process according to the invention, a solution of the polyurethane or polyurea containing both isocyanate groups and ionic groups in organic solvents is initially prepared, subsequently combined with an aqueous solution of the chain extending agent and, finally, the organic solvent is removed, preferably by distillation. In this way, the polyurea powders according to the invention are obtained in the form of a sedimenting aqueous dispersion.

One particular advantage of this embodiment is that there is no need to use high speed stirrers, instead the NCO prepolymer can be combined with the chain-extending agent simply by stirring them together at a low speed.

The polyurethanes or polyureas used as starting material in the process according to the invention, containing both free isocyanate groups and also ionic groups, are the ionic NCO prepolymers known per se in the preparation of emulsifier free polyurethane dispersions. NCO-prepolymers which have a. an average molecular weight of from 600 to 25,000, more particularly from 800 to 15,000, even more particularly from 2,000 to 7,000, and b. an ionic group content which corresponds to an ionic group content in the chain-extended end product of from 0.01 to 0.15, preferably from 0.02 to 0.1 milliequivalents per gram, are preferably used in the process of the invention.

NCO prepolymers which may be used in the process of the invention are prepared in known manner by reacting excess polyisocyanate with preferably difunctional hydroxyl compounds especially dihydroxy polyethers or dihydroxy polyesters of the molecular weight 400 – 10,000 preferably 500 – 5,000. Crystalline polyesters and especially dihydroxy polycarbonates of this molecular weight range are particularly preferred. Suitable polyisocyanates are preferably diisocyanates as those known in the art for example aliphatic diisocyanates such as tetramethylene diisocyanate, hexamethylene diisocyanate, octamethylene diisocyanate, cycloaliphatic diisocyanates such as cyclohexane, diisocyanate, hydrogenated 4,4'-diisocyanatodiphenylmethane, 3,3,5-trimethyl-5-isocyanatomethyl-cyclohexylisocyanate, aromatic diisocyanates such as 2,4-diisocyanatotoluene, 2,6-diisocyanatotoluene or 4,4'-diisocyanatodiphenylmethane. The preparation of the NCO prepolymers containing ionic groups is preferably carried out by reacting excess diisocyanate with one or several of above higher molecular weight dihydroxy compounds, chain-lengthening agents containing ionic groups or groups capable of being converted into ionic groups and optionally chain-lengthening agents which do not contain such groups. Chain-lengthening agents containing ionic groups or groups capable of being converted into ionic groups e.g. listed in U.S. Pat. No. 3,388,087 or in U.S. Pat. application Ser. No. 234,315 filed on Apr. 13, 1972, now U.S. Pat. No. 3,756,992. The preparation of the NCO prepolymers containing ionic groups is described in detail in U.S. Pat. application Ser. No. 234,315 filed on Apr. 13, 1972.

The properties of the polyurea powders according to the invention can be specifically varied within wide limits by suitable measures. This applies particularly as regards the hardness and size of the particles.

The size of the particles is crucially affected by the ionic group content of the pre-adduct while their hardness is largely determined by the type of polyisocyanates and compounds containing reactive hydrogen atoms. In general the size of the particles is decreased with increasing amount of ionic groups contained in the powders. If the choice of these compounds is confined to those with low molecular weights of down to about 500, then relatively hard products are obtained whereas if compounds with relatively high molecular weights of up to about 10,000 are exclusively used, then softer products are obtained. Any mixing ratios are possible between these extremes. Since pre-adduct formation optionally carried out in solvents is conducted with relatively large excesses of isocyanate (the molar ratio of the NCO groups to the reactive hydrogen atoms is preferably between 4 and 1.1, most preferably between 3 and 1.4) so that the molecular weights do not undergo any appreciable increase, there is no need for strict linearity in the chain structure. However, it is preferred to use linear NCO prepolymers having two terminal aliphatic isocyanate groups in the process according to the invention. Commercial grade solvents still containing water can be used in the preparation of the prepolymers.

As already explained, the process according to the invention is preferably carried out by combining a solution of the prepolymers with an aqueous solution or dispersion of the chain-extending agent. In exceptional cases, the chain-extending agent can also be dissolved in an organic solvent added during dispersion. This is especially advisable if the chain-lengthening agent is insoluble in water. In this case the chain-lengthening agent is either dissolved in an organic solvent such as acetone or in a mixture of such a solvent and water. Basically, the process according to the invention can be carried out in accordance with conventional processes (U.S. Pat. No. 3,479,310 and U.S. Pat. application Ser. No. 234,315 filed Apr. 13, 1972, now U.S. Pat. No. 3,756,992) for the production of emulsifier-free polyurethane dispersions.

In the practical application of the process according to the invention, the chain-extending agent is used in such a proportion as to give an NH : NCO ratio of from 0.1 to 0.95, preferably from 0.25 to 0.85.

Suitable chain-extending agents include in particular diamines containing two primary and/or secondary aliphatic amino groups of the general formula

in which

A stands for a divalent aliphatic hydrocarbon radical having 1 to 18 carbon atoms, a divalent cycloaliphatic hydrocarbon radical having 5 – 15 carbon atoms, a divalent aromatic hydrocarbon radical having 6 to 15 carbon atoms, a divalent araliphatic hydrocarbon radical having 7 – 15 carbon atoms and R and R' are the same or different radicals and stand for hydrogen or an aliphatic hydrocarbon radical having 1 to 4 carbon atoms or R and R' form together a polymethylene chain containing 2 to 4 methylene groups thus providing a cyclic bis-secondary diamine.

Suitable chain-lengthening agents include also dicarboxylic acid bis-hydroxides of the general formula

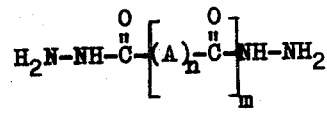

in which n and m stand for 0 or 1 and in which A has the meaning already indicated hereinbefore.

So far as the chain-extending agents just mentioned are concerned, it can be assumed that the amino groups arranged in the β-position to the carbonyl groups are primarily responsible for the chain-extending reaction so that the dicarboxylic acid-bis-hydrazides can be regarded in approximate terms as difunctional chain-extending agents. Diamines suitable for use as chain-extending agents in the process according to the invention include, in particular, low molecular weight diamines with a molecular weight of less than 250, for example ethylene diamine, propylene diamine, N-methyl propylene diamine, butylene diamine, hexamethylene diamine, piperazine, 2-methyl piperazine, dimethyl piperazines, N,N'-dimethyl ethylene diamine, N,N'-diethyl ethylene diamine, N,N'-diisopropyl ethylene diamine, N,N'-dimethyl-1,2-propylene diamine, N,N'-diisopropyl-1,2-propylene diamine, N,N'-bis-hydroxy ethyl ethylene diamine, N-hydroxy ethyl ethylene diamine, N-hydroxy propyl ethylene diamine, N,N'-bis-(hydroxy propyl)-ethylene diamine, N,N'-dimethyl hexamethylene diamine, 1,3-propylene diamine, γ,γ'-bis-amino propyl sulfide, γ,γ'-bis-amino propyl methyl amine, N,N-bis-(γ-amino propyl)-aniline, N,N-bis(γ-amino propyl)-m-toluidine etc. Other suitable chain extending agents for the process according to the invention include ether diamines and ester diamines and also diamines of the kind formed during the hydrogenation of cyanethylated diols and bifunctional dihydroxy polyesters or dihydroxy polyethers.

The diamines can be used in the form of their salts, for example, in the form of carbonates or acetates. Salt formation can also be carried out in part only, for example in order to improve solubility. Salt formation on the primary amino group results in a reduction in reactivity.

Examples of dicarboxylic acid-bis-hydrazides suitable for use as chain extending agents in the process according to the invention include bis-hydrazides of low molecular weight dicarboxylic acids with a molecular weight of less than 250, such as carbonic acid-bis-hydrazides, oxalic acid-bis-hydrazide, succinnic acid-bis-hydrazide, adipic acid-bis-hydrazide, phthalic acid-bis-hyrazide, terephthalic acid-bis-hydrazide, tetrahydrophthalic acid-bis-hydrazide etc. Difunctional polyesters with terminal carboxylic acid hydrazide groups can also be used in the process according to the invention.

Solvents suitable for carrying out the process according to the invention include, in particular, water-miscible solvents which have boiling points below 100°C, such as acetone, methylethyl ketone, tetrahydrofuran or ethyl acetate. Solvents which are immiscible with water can also be used providing the reactants are intensively stirred by means of a suitable stirrer during the process according to the invention. Examples of solvents such as these include benzene and toluene. Although the joint use of solvents with boiling points at temperatures above 100°C, such as toluene, or even of such solvents as chlorobenzene, dimethyl formamide or dimethyl sulphoxide, is also possible, it generally involves more work due to the need to remove the solvent from the end products.

One particularly preferred embodiment of the process according to the invention is described in detail in the following:

In the synthesis of the ionic NCO-prepolymer from dihydroxy compounds known per se having molecular weights of from 500 to 5,000, diisocyanates and, optionally, chain-extending agents, the diisocyanate is used in excess in such an amount that the adduct preferably contains from 1 to 4% by weight of free NCO groups. The NCO-prepolymer preferably contains from 1 to 15 milliequivalents per 100 g of quaternary nitrogen or carboxylate or sulfonate groups. The ionic NCO prepolymer is preferably dissolved in acetone to form a 30 to 90% by weight solution before dispersion. Solutions of this kind have viscosities in the range of from 30 to 8,000 cP at 50°C.

These ionic NCO prepolymer solutions in acetone are mixed with aqueous solutions of aliphatic diamines containing two primary and/or secondary amino groups. The acetone is then distilled off and the polyurea powder according to the invention is obtained in the form of an aqueous sedimenting dispersion. The end product can be obtained in pure form by straightforward filtration and can be re-dispersed in water at any subsequent time.

Mixing can be carried out by introducing the aqueous solution into the acetone solution or the acetone solution into the aqueous solution with stirring. Mixing is preferably carried out continuously in a suitable apparatus by introducing the two solutions into a mixing vessel, for example by means of pumps. In its most simple form, the mixing vessel is provided with a stirrer and an overflow through which the aqueous-acetone dispersion flows into a distillation apparatus. The dispersion temperature is between 20 and 60°C, most preferably between 35° and 55°C. The quantity of water required for dispersion in which the diamine is dissolved amounts to between 0.8 and 3 times, preferably to from 1 to 2 times, by weight, the quantity of the ionic NCO prepolymer.

45 to 70% solutions of the prepolymers in organic solvents are preferred in cases where mixing is carried out with low-speed stirrers.

High-speed stirrers are preferably used for continuous mixing at high throughput rates, although it is possible to use mixers of the kind which enable intensive shear forces to be applied.

Suitable machines, such as screw machines, especially multishaft screws, internal mixers, high-pressure or low pressure mixing chambers with countercurrent mixing, dispersers, ultrasonic dispersers, are known to the expert.

Where apparatus of this kind are used, it is preferred to use 70–90% solutions and, given adequately free-flowing prepolymers, there is actually no need at all to use solvents.

The properties of the polyurea powders initially accumulating in the form of suspensions can be decisively influenced not only by the chemical composition of the polyisocyanate pre-adduct, but also by the conditions under which dispersion is carried out. The most important factors are: type of the chain-extending agents thus e.g. if the bis-hydrazides of dicarboxylic acids are used as chain-extending agents relatively hard particles are obtained whereas when hexamethylene diamine is used as chain-extending agent relatively smooth particles are obtained; and the reaction temperatures which can be varied from about 0°C up to the boiling point of the organic solvent thus e.g. the higher the temperature the faster the chain-lengthening reaction proceeds as a result of which most uniform particles are obtained. However, extreme temperatures are not always suitable since the powders may also tend to agglomeration at too high temperatures. If a solvent is used with a low boiling point the reaction temperature may be increased by the application of external pressure.

Another important factor is the procedure adopted to mix the aqueous phase and the organic phase, i.e. whether it is carried out substantially simultaneously, for example in a continuous mixer, or whether the organic phase is introduced into the aqueous phase or the aqueous phase into the organic phase. However, it is again emphasized that the required obejective can be achieved by simple means, for example by allowing the aqueous phase to flow into the organic phase while stirring with a normal stirrer. The organic solvent, if any, is removed by distillation either after or during mixing.

The polyurea powders obtained by the process according to the invention are distinguished by in particular the following characteristics:
a. an average particle diameter in the range of from 10 to 1,000 $\mu$,
b. a melting range between 100°C and 180°C;
c. a urea and, optionally, urethane group content of from 10 to 30% by weight, with the proviso that the urea group content is at least about 5%; and
d. an ionic group content of from 0.01 to 0.15 milliequivalents per gram.

The polyurea particles according to the invention may be either spherical or elongated in shape.

Depending upon their properties, suspensions of the kind in question can be used for different applications, even in conjunction with crosslinking additives, for example for finishing textiles and leather, for coatings, for consolidating webs or for laminating purposes. They can be used as binders or as auxiliary agents in the paper industry. The coarser suspensions can be converted by filtration and the finer suspensions, for example, by freeze-drying, spray drying, optionally with additions of lubricants for example barium stearate, or even by cylinder drying into powders which in turn can be used for various purposes, for example for bonding by heat sealing, for electrostatic coating, for fluidization dip-coating, for calendered films and pastes. In either case, the suspensions can be prepared in the absence of emulsifiers. However, it is of course possible additionally to stabilize the suspensions, by the subsequent addition of emulsifiers, against coagulation, for example of the kind induced by electrolytes. Non-ionic stabilizers are preferably used in cases such as these although protective colloids can also be used.

The invention may be more readily understood by referring to the following examples, in which all parts and percentages are by weight unless otherwise specified.

EXAMPLES

Preparation of prepolymer solutions in acetone:
Prepolymer (I) 950 g of a hexane diol polycarbonate of molecular weight 1870 were dehydrated at 120°C/15 Torr. 151 g of hexamethylene diisocyanate were added thereto at 106°C, and the resulting mixture was kept at 100°C for 1 hour and then allowed to cool to 60°C over a period of another hour. 8 g of N-methyl diethanolamine in solution in 75 g of acetone were then added, the temperature was maintained at 60°C for about 3 hours after which the mixture was diluted with another 200 g of acetone. On the next day the mixture was heated to 55°C and quaternized with 6.2 ml of dimethyl sulfate in solution in 842 g of acetone (45 minutes at 50°C). 2,234 g of a 50% solution of a weakly cationic prepolymer were obtained.
NCO = 1.22%
$\eta$ (at 25°C) = 182 cP
$\eta$ (at 50°C) = 125 cP IA. The NCO prepolymer was prepared in exactly the same way as prepolymer (I), but with 12 g of N-methyl diethanolamine instead of 8 g
50% in acetone
NCO = 0.98%

II. The NCO prepolymer was prepared in exactly the same way as prepolymer (I) but with 1,008 g of an adipic acid-neopentyl glycol-hexane diol polyester of molecular weight 1,890.
50% in acetone
NCO = 1.06%

II A. Preparation as for prepolymer (I) but with 905 g of the adipic acid-neopentyl glycol-hexane diol polyester used for (II).
50% in acetone
NCO = 1.35%

Prepolymers II and II A which are prepared from non-crystallizing polyesters lead to very smooth polyurea powders which tend to agglomerate (see examples 10 – 13). This is the reason why crystallizing polyesters or polycarbonates are preferred.

III. 1,980 g of diol polycarbonate of molecular weight 1,980 were dehydrated at 120°C/18 Torr. 40.2 g of dimethylol propionic acid were added to the melt, after which 404 g of hexamethylene diisocyanate were stirred in at around 100°C. The temperature was kept at 100°C for 1 hour and then at 90°C for a further hour. Thereafter, the melt had an NCO-content of from 3.7 to 3.9%. It was diluted with 762 g of acetone, left standing overnight and a solution of 26 g of triethylamine in 1,688 g of acetone was added on the next day. 4,900 g of a 50% solution of a very weakly anionic prepolymer in acetone with an NCO-content of 1.37 to 1.48% and a viscosity of 170 to 180 cP at room temperature, were obtained.

IV. The following 50% by weight prepolymer solutions in acetone are prepared in accordance with Example I.

Table 1

|  | PE[1] | H[2] | MDA[3] | DMS[4] | NCO % |
|---|---|---|---|---|---|
| (IV a) | 950 g | 151 g | 8 g | 6.2 ml | 1.20 |
| (IV b) | 910 g | 151 g | 8 g | 6.2 ml | 1.35 |
| (IV c) | 950 g | 170 g | 12 g | 9.3 ml | 1.49 |

[1]PE = polyester of adipic acid/butane diol of molecular weight 1950
[2]H = 1,6-hexamethylene diisocyanate
[3]MDA = N-methyl diethanolamine
[4]DMS = dimethyl sulphate Aqueous sedimenting polyurethane polyurea powders according to the invention were prepared from these prepolymer solutions in acetone by mixing them (stirring them together) with aqueous solutions of primary and/or secondary diamines (cf. Table 2).

Table 2

| Example No. | Prepolymer | NCO(%) | In-diamine | NH/NCO ratio | Ratio by weight of H₂O to end product | melting point °C | Remarks |
|---|---|---|---|---|---|---|---|
| 1 | I | 1.19 | piperazine | 0.79 | 1.4 | 120–122 | spontaneous powder formation |
| 2 | I | 1.19 | piperazine | 0.79 | 1.6 | 120–122 | spherical form |
| 3 | I | 1.18 | piperazine | 0.79 | 1.8 | 116–118 | spherical form |
| 4 | I | 1.21 | piperazine | 0.77 | 2.4 | 121–123 | spherical form |
| 5 | I | 1.17 | ethylene diamine | 0.80 | 2.2 | 128–132 | spherical form |
| 6 | I | 1.12 | ethylene diamine | 0.84 | 2.2 | 133–137 | spherical form |
| 7 | I | 1.20 | propylene diamine | 0.78 | 2.0 | 146–150 | spherical form |
| 8 | I | 1.14 | dimethyl piperazine | 0.84 | 2.0 | 132–134 | spherical form |
| 9 | IA | 0.98 | dimethyl piperazine | 0.91 | 2.0 | 130 | spherical form |
| 10 | II | 1.07 | piperazine | 0.86 | 2.4 | 136–144 | spherical but with a marked tendency towards agglomeration and sticking |
| 11 | II | 1.06 | ethylene diamine | 0.87 | 1.8 | 164–170 | spherical but with a marked tendency towards agglomeration and sticking |
| 12 | IIA | 1.35 | ethylene diamine | 0.72 | 2.4 | 112–118 | spherical but with a marked tendency towards agglomeration and sticking |
| 13 | IIA | 1.36 | piperazine | 0.31 | 2.4 | 145–154 | spherical but with a marked tendency towards agglomeration and sticking |
| 14 | I | 1.32 | piperazine | 0.90 | 2.0 | 126–130 | spontaneous powder formation-spherical form |
| 15 | I | 1.32 | dimethyl piperazine | 0.90 | 2.0 | 86–90 | spontaneous powder formation-spherical form |
| 16 | I | 1.32 | propylene diamine | 0.90 | 2.0 | 118–125 | spontaneous powder formation-spherical form |
| 17 (Comparison) | I | 1.34 | ethylene diamine | 1.00 | 2.0 | 132–140 | curdling: cannot be satisfactorily dispersed |
| 18 | I | 1.35 | piperazine | 0.75 | 2.0 | 120–124 | spontaneous powder formation-spherical form |
| 19 | I | 1.35 | dimethyl piperazine | 0.75 | 2.0 | 82–86 | spontaneous powder formation-spherical form |
| 20 | I | 1.35 | propylene diamine | 0.75 | 2.0 | 106–110 | spontaneous powder formation-spherical form |
| 21 | I | 1.19 | propylene diamine | 0.80 | 1.8 | 127–133 | spontaneous powder formation-spherical form |
| 22 | I | 1.19 | propylene diamine | 0.80 | 2.0 | 129–135 | spontaneous powder formation-spherical form |
| 23 | I | 1.19 | carbohydrazide | 0.80 | 2.0 | 132–138 | spontaneous powder formation-spherical form |
| 24 | I | 1.16 | propylene diamine | 0.85 | 2.0 | 137–146 | spontaneous powder formation-spherical form |
| 25 | I | 1.16 | dimethyl piperazine | 0.85 | 2.0 | 95–105 | spontaneous powder formation-spherical form |
| 26 | I | 1.17 | carbohydrazide | 0.85 | 2.0 | 152–158 | agglomerating spheres |
| 27 | I | 1.17 | adipic acid dihydrozide | 0.85 | 2.0 | 160–166 | agglomerating spheres |
| 28 | III | 1.43 | ethylene diamine | 0.91 | 2.4 | 186–190 | spontaneous powder formation-spherical form |
| 29 | III | 1.48 | ethylene diamine | 0.60 | 2.4 | 190–192 | spontaneous powder formation-spherical form |
| 30 | III | 1.37 | dimethyl piperazine | 0.30 | 2.4 | 186–190 | spontaneous powder formation-spherical form |
| 31 | III | 1.37 | dimethyl piperazine | 0.50 | 2.4 | 170–174 | spontaneous powder formation-spherical form |
| 32 | IV a | 1.20 | propylene diamine | 0.85 | 2.0 | 163–169 | spontaneous powder formation-spherical form |
| 33 | IV b | 1.35 | propylene diamine | 0.85 | 2.0 | 167–171 | spontaneous powder formation-spherical form |
| 34 | IV c | 1.49 | propylene diamine | 0.85 | 2.0 | 157–161 | spontaneous powder formation-spherical form |

The following embodiments show that, where ethylene diamine is used in equivalence (100% of the theoretical, based on the NCO-content) it is not possible to obtain polyurethane polyurea powders according to the invention.

EXAMPLE 35 a. 445 of the 50% acetone prepolymer solution III (NCO = 1.48%) had the equivalent quantity (157 g) of 1n-ethylenediamine in 1,380 g of water added to them over a period of about 1 minute with stirring at around 1,500 r.p.m. After decantation, washing and drying, 225 g of a polyurethane polyurea mass were obtained in the form of spheres with sizes ranging from that of a pea to that of a cherry.

35 b. The procedure of 35 (a) was repeated in the opposite sequence, i.e. the aqueous ethylenediamine solution was initially introduced and the acetone prepolymer solution added thereto with vigorous stirring. A two-phase curdled mass was immediately obtained. Yield: 219 g.

35 c. The two components from 37 (a) were combined by continuous mixing in a suitable laboratory apparatus (metering pumps, mixing vessel and overflow). The material suddenly thickened and curdled.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of thermoplastic polyurethane-polyurea powders having an average particle diameter of from 10 to 1,000 $\mu$ said process comprising stirring and reacting:
    a. polyurethanes containing free NCO groups and ionic groups, said ionic groups being present in the polyurethanes in an amount such that the end products have an ionic group capable of salt formation in a content of from 0.01 to 0.15 milliequivalents per gram, with
    b. primary and/or secondary diamines having aliphatic amino groups and/or dicarboxylic acid-bis-hydrazides at an NH to NCO ratio of from between 0.1 to 0.95 and in the presence of water until said powder is formed and recovering said powder.

2. The process of claim 1 wherein the polyurethanes contain two terminal aliphatic isocyanate groups.

3. The process of claim 1 wherein the polyurethanes have an average molecular weight of from 600 to 25,000.

4. The process of claim 1 wherein the polyurethanes have an average molecular weight of from 800 to 15,000.

5. The process of claim 1 wherein the polyurethanes have an average molecular weight of from 2,000 to 7,000.

6. The process of claim 1 wherein the polyurethanes contain from 1 to 4% by weight of free NCO groups.

7. The process of claim 1 wherein the ionic groups are present in the polyurethanes in an amount such that the end products have an ionic group content of from 0.02 to 0.1 milliequivalents per gram.

8. The process of claim 1 wherein the polyurethanes are reacted in the form of a solution in an organic solvent.

9. The process of claim 8 wherein the organic solvent is acetone.

10. The process of claim 1 wherein the primary and/or secondary diamines and/or dicarboxylic acid-bis-hydrazides are reacted in the form of aqueous solutions.

11. The process of claim 1 wherein the diamines are used in the form of their carbonate or acetate salts.

12. The process of claim 1 wherein the ionic groups of the polyurethane-polyurea end product are quaternary nitrogen, carboxylate or sulfonate groups.

13. The process of claim 8 wherein the organic solvent is a water-miscible solvent having a boiling point below 100°C.

14. The process of claim 1 wherein the range of NH to NCO ratio is 0.25 to 0.85.

15. The process of claim 1 wherein the water is present in an amount of from 0.8 to 3 times, by weight, the amount of polyurethane-polyurea end product.

16. A process for the production of a sedimenting aqueous dispersion of thermoplastic polyurethane-polyurea powders having an average particle diameter of from 10 to 1,000 $\mu$, said process comprising the steps of
    a. preparing a solution in an organic solvent of polyurethanes containing free NCO groups and ionic groups, said ionic groups being present in the polyurethanes in an amount such that the end products have an ionic group capable of salt formation in a content of from 0.01 to 0.15 milliequivalents per gram,
    b. reacting and agitating the solution of (a) with an aqueous solution of primary and/or secondary diamines having aliphatic amino groups and/or an aqueous solution of dicarboxylic acid-bis-hydrazides, and
    c. removing the organic solvent by distillation; and subsequently removing water to recover a powder said polyurethanes being reacted with the diamines or dicarboxylic acid-bis-hydrazides at an NH to NCO ratio of from 0.1 to 0.95.

17. Thermoplastic polyurethane polyurea powders characterized by
    a. an average particle diameter of from 10 to 1,000 $\mu$,
    b. a melting range from 100° to 180°C,
    c. a urea group content of from about 5 to 30% by weight, and
    d. an ionic group capable of salt formation in a content of from 0.01 to 0.15 milliequivalents per gram.

* * * * *

UNITED STATES PATENT AND TRADEMARK OFFICE
CERTIFICATE OF CORRECTION

PATENT NO. : 3,868,350
DATED : February 25, 1975
INVENTOR(S) : Helmut Reiff; Harro Witt; Dieter Dieterich It is certified that error appears in the above-identified patent and that said Letters Patent are hereby corrected as shown below:

Column 2, line 41, correct the spelling of --with--

Column 3, line 50, after "1972" add --, now U.S. 3,756,922--

Column 4, line 57, "bis-hydroxides" should be --bis-hydrazides--

Signed and Sealed this ninth Day of March 1976

[SEAL]

Attest:

RUTH C. MASON
Attesting Officer

C. MARSHALL DANN
Commissioner of Patents and Trademarks